Patented Dec. 15, 1936

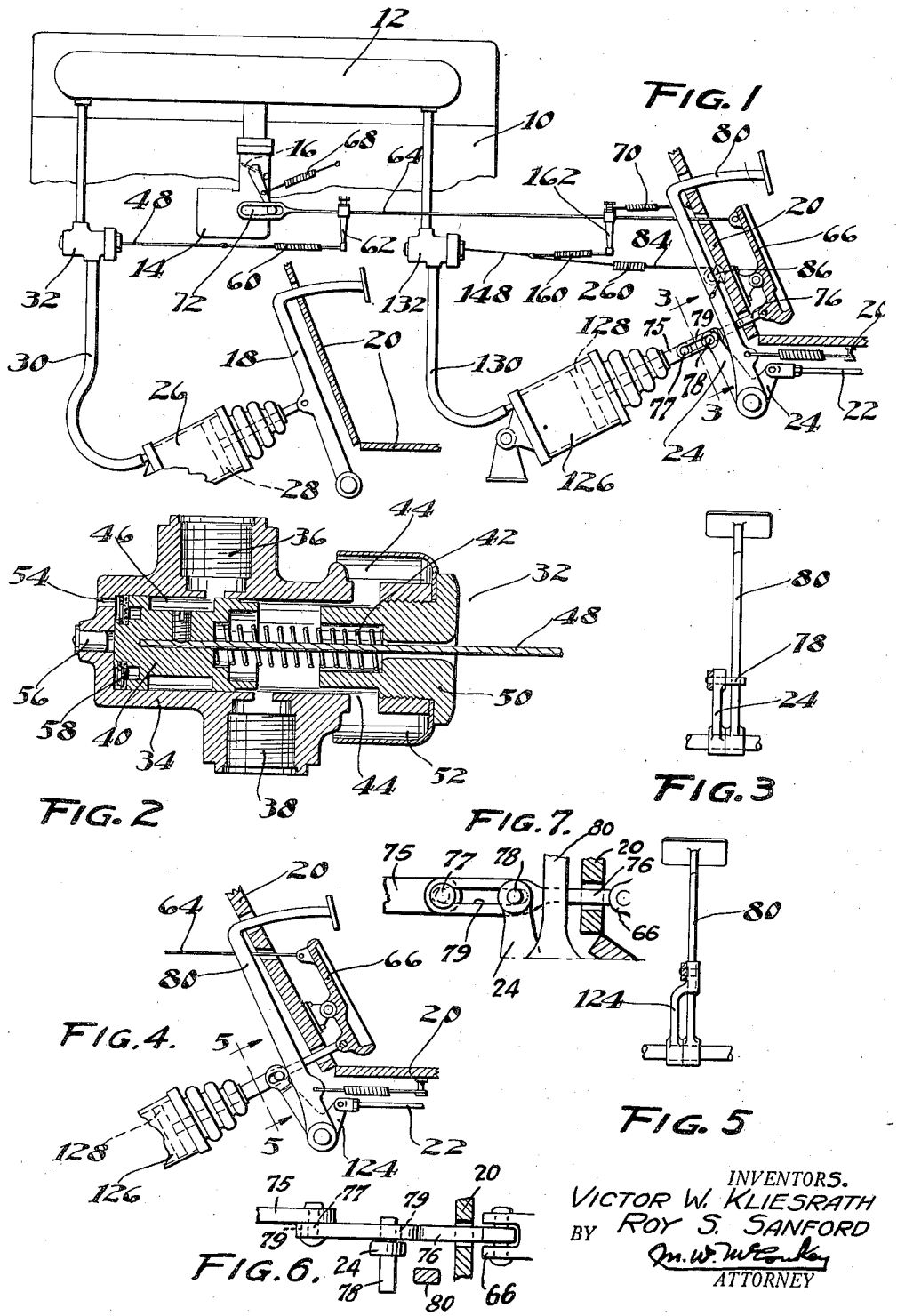

2,064,612

UNITED STATES PATENT OFFICE 2,064,612

CONTROL MECHANISM

Victor W. Kliesrath, South Bend, Ind., and Roy S. Sanford, New York, N. Y., assignors to Bragg-Kliesrath Corporation, South Bend, Ind., a corporation of New York Application August 28, 1931, Serial No. 559,989
Renewed February 21, 1934

10 Claims. (Cl. 192—.01)

This invention relates to controls, especially for brakes and/or clutches, and is illustrated as embodied in an automobile having power operation of the brakes and the clutch.

An object of the invention is to provide simple mechanism for controlling the brakes and the clutch, and preferably also the throttle, and which is adapted for power operation. In one arrangement the accelerator pedal, which normally operates only the throttle, is connected to control power operation of the clutch and also to control power actuation of the brakes, independently of the usual brake pedal, which can be manipulated in the usual manner if desired but which is unaffected by the application of the brakes under the control of the accelerator.

Preferably the reverse is also true, the accelerator connections being unaffected by manipulation of the brake pedal, although we prefer that the brake pedal as well as the accelerator be arranged to control the power for the brakes and also to apply physical force thereto.

The above and other novel combinations of parts and desirable particular constructions, constituting features of the invention, will be apparent from the following description of the illustrative embodiments shown in the accompanying drawing, in which:

Figure 1 is a diagrammatic partial longitudinal section through an automobile, showing the above-described connections in side elevation;

Figure 2 is a section through one of the control valves;

Figure 3 is a front elevation of the brake pedal and adjacent parts;

Figure 4 is a partial section, corresponding to part of Figure 1, but showing a different arrangement of the brake and accelerator pedals;

Figure 5 is a front elevation, corresponding to Figure 3, but showing the brake pedal of Figure 4.

Fig. 6 is an enlarged detail top plan view of the piston rod and its connection to the control levers, and Fig. 7 is an enlarged detail side elevation of piston rod and its connection to the control levers.

The arrangement illustrated in Figure 1 includes an engine 10 having an intake manifold 12 and a carburetor 14, with the usual throttle 16, together with a clutch operated by means such as a pedal 18 pivotally mounted below the floor-board 20 and projecting upwardly through the floor-board, and a braking system actuated by means such as a brake rod 22 operatively connected to a bellcrank lever 24 arranged below the floor-board.

The clutch pedal 18, or its equivalent, when not manually operated is operated by power from a device shown as including a vacuum cylinder 26 containing a piston 28 connected pivotally to the pedal. The cylinder 26 is connected to the intake manifold 12 by means such as a conduit 30 controlled by a valve 32 shown in detail in Figure 2, but not claimed herein as it is the invention of Victor W. Kliesrath, and is fully described and is claimed in his application No. 568,081, filed October 10, 1931.

The valve 32, in the form illustrated, includes a fixed casing 34 having an inlet 36 communicating with the manifold 12 and an outlet 38 communicating with the conduit 30. Within the cylinder formed by this casing is a valve piston 40, urged toward the left by a light spring 42 to place the outlet 38 in communication with the atmosphere through openings 44, so that in this position the clutch is engaged.

The valve piston 40 may be pulled to the right, to place inlet 36 in communication with the outlet 38 through an annular passage 46, by means such as a tension wire or the like 48 passing through an opening in a threaded end plug 50 which holds a cover or baffle cup 52 protecting the openings 44.

Movement of the valve piston is facilitated by a vent 54 in the end of the valve casing, and by an inwardly-opening check valve 56 which permits the piston to move freely to the right but slows up its movement to the left to cause clutch engagement. The piston may also have a friction washer 58 to promote uniformity of movement during clutch engagement.

The valve piston is connected, through the wire 48 and a coil spring 60, with a bracket 62 or the like fixed on the throttle-actuating rod 64 which is operated by means such as a centrally-pivoted accelerator 66 against the resistance of return springs 68 and 70.

The connection to the throttle is preferably through a lost-motion means such as a slot 72, so that the accelerator may be further operated after the throttle is closed, and also (by stretching spring 60) after the valve piston 40 is in its extreme right-hand position. In the normal position with the foot off the accelerator, the throttle is closed as shown, and the valve piston 40 has been shifted to the right to disengage the clutch after the closing of the throttle, thereby taking up part of the lost motion. To this end the spring 70 is substantially stronger than spring 42, but is not strong enough to overcome spring 60.

Depression of the heel end of the accelerator pedal 66, without disturbing the closed throttle or the right-hand position of valve piston 40 which holds the clutch disengaged, except to stretch the spring 60 and hold the valve piston somewhat more firmly, operates a thrust link 76 having a slot 79 having lost-motion connection with a pin 78 carried by the end of bellcrank lever 24 thereby applying the brakes.

The slot 79 also engages, in lost motion fashion, the pin 77 on the piston rod 75, whereby movement of the link 76 may overrun the piston rod.

At the same time it operates, through a bracket 162 on the throttle connection 64, and preferably through a tension spring 160, a connection 148 to a second valve 132 of the same construction as valve 32, and which is timed to be actuated only upon depression of the heel end of the accelerator 66.

Valve 132 controls communication between the intake manifold 12 and a conduit 130 leading to a brake power cylinder 126 containing a piston or the like 128 having a lost-motion slotted connection to lever 24. Thus depression of the heel of the accelerator pedal not only applies physical power to the brakes but also applies vacuum power thereto.

We prefer to provide also a service brake pedal 80, loosely pivoted for example on the fulcrum shaft of bellcrank lever 24, and depressible against the resistance of a spring 82 into engagement with the oppositely extended end of the pin 78, thereby also to apply physical force to the brake connections. If desired, the pedal 80 may be depressed by the left foot (since the clutch is held out by power), while at the same time the accelerator 66 is depressed at its heel end by the right foot.

If desired, pedal 80 may have a wire or other connection 84 acting through a coil spring 260 on the wire 148 to open the valve 132, the wire being shown as passing over a fixed pulley 86 so that it is tensioned by depressing the pedal. By this arrangement the pedal 80 controls the brake-applying power device as well as the accelerator.

In the alternative arrangement of Figures 4 and 5, the pedal 80 engages the bellcrank lever 124 which applies the brakes and which also is connected to the accelerator 66, so that the pedal also pulls down the accelerator to close the throttle and open both the valves 32 and 132.

While two illustrative embodiments have been described in detail, it is not our intention to limit the scope of the invention to those particular embodiments, or otherwise than by the terms of the appended claims. It is not our intention to claim herein any of the subject-matter of applications Nos. 557,241 and 557,242 filed August 15, 1931, by Victor W. Kliesrath, the invention of the present application being junior thereto.

We claim:

1. A vehicle having a throttle, a power clutch, and a power brake, an operating member controlling the throttle and the power for the clutch and the power for the brake and also arranged to apply manual pressure to the brake, and another operating member arranged to control the power for the brake and to apply manual pressure to the brake, each of said operating devices being unaffected by the application of the other.

2. A vehicle having a throttle, a power clutch, and a power brake, an operating member controlling the throttle and the power for the clutch and the power for the brake, and another operating member arranged to control the power to either apply or release the brake and to apply manual pressure to the brake, each of said operating devices being unaffected by the application of the other.

3. A vehicle having a throttle, a power clutch, and a power brake, an operating member controlling the throttle and the power for the clutch and the power for the brake, and another operating member arranged to control the power to either apply or release the brake and to apply manual pressure to the brake, said second operating member being unaffected by the application of the first operating member.

4. A vehicle having a throttle, a power clutch, and a power brake, an operating member controlling the throttle and the power for the clutch and the power for the brake, and another operating member arranged to control the power to apply the brake and to apply manual pressure to the brake, said first operating member being unaffected by the application of the second operating member.

5. Operating mechanism comprising a lever connected to operate brakes or the like, a power device connected to said lever to operate it, a control device for the power device, a pivoted control lever having one part connected to the control device and another part connected to apply physical force to the lever, and another control lever having one-way engagement with said first lever to apply physical force thereto and actuating said first lever to rock said pivoted control lever to operate the control device.

6. An automotive vehicle provided with a brake mechanism, power means for operating said mechanism comprising a pressure differential operated motor, a valve for controlling the operation of the motor, two separate manually operable members, and connections interconnecting the brake mechanism, motor, valve, and manually operable members, said connections being so constructed and arranged as to provide for a simultaneous physical operation of the brake mechanism, and an operation of the valve to initiate a power application of the brake mechanism with the actuation of one of said manually operable members and to provide, with the actuation of the other manually operable member, an operation of the valve mechanism to initiate a power application of the brake mechanism prior to a physical operation of said mechanism by said other manually operable member.

7. An automotive vehicle provided with an accelerator, a clutch and a brake pedal, accelerator controlled power means for operating the clutch, and means interconnecting the pedal and accelerator whereby upon applying the brakes the power means is energized to disengage the clutch.

8. An automotive vehicle provided with a throttle, an accelerator, brakes, a clutch and a brake pedal, power means for operating the clutch including a valve, and means interconnecting said valve, throttle, accelerator and brake pedal whereby upon applying the brakes through the intermediary of said pedal the accelerator is returned to its off position to close the throttle and the aforementioned valve is operated to effect an energization of the power means to disengage the clutch.

9. An automotive vehicle provided with brakes and a brake pedal, a clutch and a throttle controlling accelerator, power means including valvular means for operating both the brakes and the clutch, and means, interconnecting the accelerator, valvular means and brake pedal, for selectively operating the throttle and clutch by the accelerator and the brakes by the brake pedal.

10. An automotive vehicle provided with brakes, a manually operated accelerator and a manually operated brake pedal, power means for operating the brakes comprising valve means for controlling the operation of the power means, connections interconnecting the accelerator, brake pedal, brakes and valve means whereby the valve means may be independently operated by either the accelerator or the pedal, said aforementioned connections including means interconnecting the manually operable members and brakes whereby the latter may be physically operated by each of said members.

VICTOR W. KLIESRATH.
ROY S. SANFORD.